Oct. 30, 1962 K. L. SWANSON ETAL 3,061,378
SILO UNLOADING MACHINE
Filed Sept. 22, 1960 2 Sheets-Sheet 2
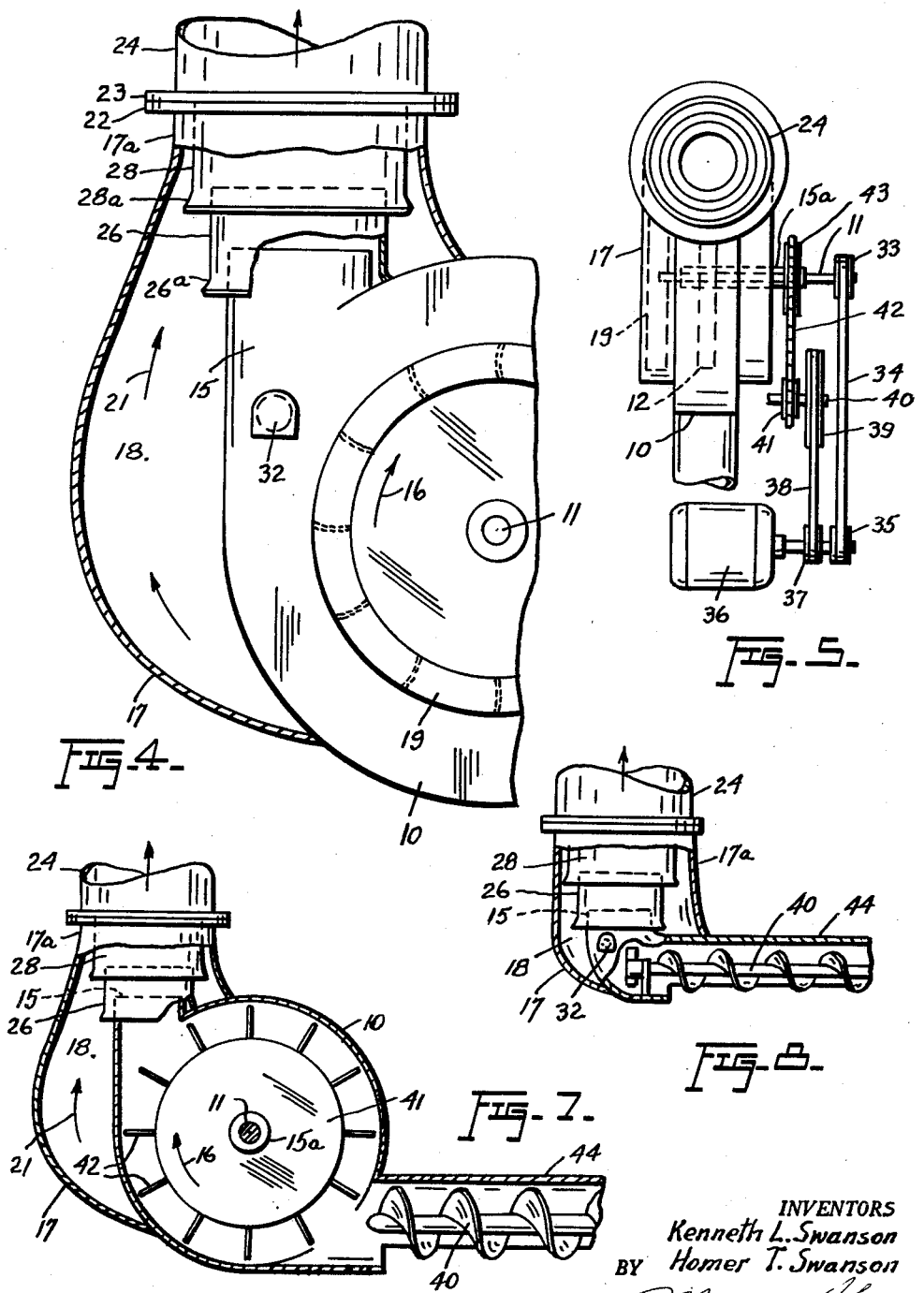
INVENTORS
Kenneth L. Swanson
Homer T. Swanson
BY
Atty.

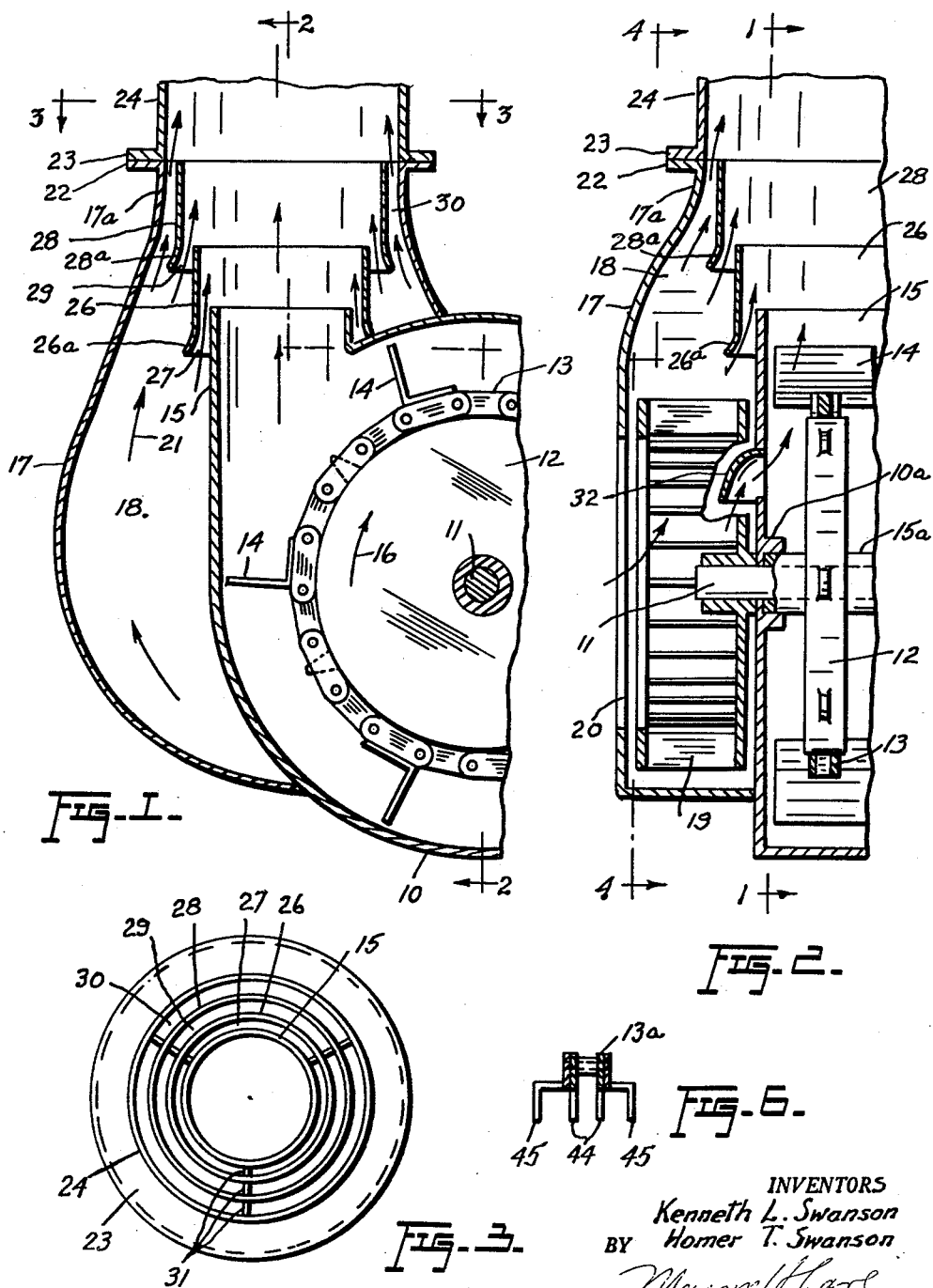

United States Patent Office 3,061,378
Patented Oct. 30, 1962

3,061,378
SILO UNLOADING MACHINE
Kenneth L. Swanson, 115 Galen St., and Homer T. Swanson, R.D. 1, both of Clyde, N.Y.
Filed Sept. 22, 1960, Ser. No. 57,780
8 Claims. (Cl. 302—23)

This invention relates to new and useful improvements in silo unloading machines of the type which are adapted to rest upon a bed of silage in a silo and are equipped with silage engaging and gathering means as well as with means for revolving or propelling them around in the silo, whereby the gathered silage is first delivered into a housing of the machine and then is forcibly discharged therefrom through an outlet member or spout oriented into an opening in the silo wall. One example of a machine of this general type is disclosed in U.S. Patent No. 2,788,247, issued April 9, 1957, to G. R. Chapman, wherein it will be noted that the silage is gathered by an endless, slat-type conveyor which passes around a drive sprocket in the housing, the latter having a discharge spout in communication with the outlet spout and the motion of the conveyor serving not only to deliver silage into the housing, but also to propel the same toward the discharge spout or duct. Moreover, vanes are provided on the sprocket so that the latter also functions as a blower or fan to assist in the discharge of the silage through the outlet.

It has been found that the conveyor has to be run at a substantial speed in order to discharge the silage since the air blown by the vanes on the sprocket has very little force. Such high speed operation of the conveyor causes damage and is detrimental to its useful life.

The principal object of this invention is to eliminate the disadvantages above outlined by providing silage discharge means which do not utilize the conveyor sprocket as a blower but employ a separate blower for maintaining air under pressure in a plenum chamber together with a multiple venturi throat disposed between the discharge duct and the outlet spout in communication with the plenum chamber, so that air delivered under pressure from the plenum chamber through the venturi throat creates a sucking action within the discharge duct for forcibly picking up and propelling silage through the outlet, the arrangement being such that the silage does not come in contact with the separate blower.

Some of the advantages of the invention reside in its simplicity of construction, efficient and dependable operation, and in its adaptability to convenient and economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a fragmentary vertical elevational view of the invention, taken substantially in the plane of the line 1—1 in FIGURE 2;

FIGURE 2 is a fragmentary vertical sectional view, taken substantially in the plane of the line 2—2 in FIGURE 1;

FIGURE 3 is a horizontal sectional detail, taken substantially in the plane of the line 3—3 in FIGURE 1;

FIGURE 4 is a fragmentary vertical sectional view, taken substantially in the plane of the line 4—4 in FIGURE 2;

FIGURE 5 is a plan view, diagrammatically illustrating the drive mechanism for the conveyor sprocket and blower;

FIGURE 6 is a fragmentary sectional detail of a modified form of the conveyor employing raker teeth;

FIGURE 7 is a fragmentary vertical sectional view of a modified form of the invention; and FIGURE 8 is a fragmentary vertical sectional view of another modified form.

Referring now to the accompanying drawings in detail, particularly to FIGURES 1–5 inclusive, the reference numeral 10 designates the housing of a silo unloading machine, for example, a machine of the type disclosed in the aforementioned Patent No. 2,788,247, although it is to be understood that the use of the invention is by no means limited to that environment and that the invention may be used broadly with machines of this general type. In any event, the housing 10 accommodates a sprocket 12 for an endless conveyor chain 13 having silage engaging slats 14 thereon, and the housing is provided with an upwardly directed discharge duct 15 toward which silage engaged by the slats is propelled when the sprocket 12 is rotated in the direction of the arrow 16.

In accordance with the invention the sprocket 12 is mounted on and driven by a tubular shaft 15a which is rotatably journalled in suitable bearings 10a in the housing 10 and a shaft 11 is journalled in and extends through the tubular shaft 15a, the shafts 11 and 15a being rotatable at relatively different speeds, as will be hereinafter explained.

A casing 17 is provided exteriorly on the housing 10 and defines a plenum chamber 18 which surrounds the duct 15. The casing is substantially of a scroll form such as is used in squirrel-cage blowers and accommodates a squirrel-cage blower or fan 19 which is secured to the shaft 11, as shown. The casing 17 has an air inlet opening 20 concentric with the blower 19 and it will be apparent that when the shaft 11 is rotated in the direction of the arrow 16, the blower 19 will propel air through the plenum chamber 18 as indicated by the arrows 21. The upper portion of the casing 17 is provided with a tubular neck 17a which extends above the discharge duct 15 and is equipped with an annular flange 22 connected to a similar flange 23 of an outlet neck piece 24.

A venturi throat is provided in the casing 17 between the discharge duct 15 and the outlet member 24, the same comprising a first sleeve-like venturi element 26 having a flared bottom portion 26a which encircles the duct 15 in spaced relation so as to provide a venturi passage 27, and a second sleeve-like venturi element 28 having a flared bottom portion 28a which encircles in spaced relation the upper portion of the element 26 so as to provide a venturi passage 29. The element 28 is spaced from the neck 17a of the casing 17 to provide a venturi passage 30, it being noted that the passages 27, 29 and 30 are annular and communicate with the plenum chamber 18 for discharging air under pressure therefrom into the outlet 24, which action creates a suction in the duct 15 and propels silage from the duct through the outlet. The venturi elements 26, 28 are secured together and to the duct 15 by suitable spacers 31, as shown in FIG. 3.

To further assist in propulsion of silage from the duct 15 through the outlet 24, an air scoop or jet 32 is provided at either or both sides of the duct in communication with the plenum chamber 18, this jet discharging air under pressure into the duct 15 so as to agitate the silage therein and assist in its upward propulsion by the sucking action created by the air passing through the venturi passages 27, 29, 30, as already explained.

The blower driving shaft 11 is intended to be driven at a much faster rate of speed than the sprocket driving tube 15a, this being attained by a drive mechanism shown in FIGURE 5 wherein a pulley 33 secured to the shaft 11 is driven by a belt 34 from a pulley 35 on the armature shaft of a suitable motor 36. The armature shaft also carries a second pulley 37 connected by a speed reducing belt drive 38 to a pulley 39 on a suitably journalled countershaft 40, the latter also carrying a sprocket 41 connected by a speed reducing chain drive 42 to a sprocket 43 on the conveyor driving tube 15a. It will be evident from the foregoing that the blower 19 may be driven at a proper operating speed without unduly increasing the speed of rotation of the conveyor driving sprocket 12.

FIGURE 6 illustrates a modified arrangement of the conveyor wherein alternate links of the conveyor chain 13a are provided, respectively, with closely spaced and widely spaced teeth 44, 45, these teeth operating in a raking fashion to gather and propel the silage in place of the aforementioned slats 14.

The arrangement of the invention shown in the accompanying FIGURE 7 is the same as already described in connection with FIGURES 1–5, but the arrangement of the unloading machine is somewhat different in that in place of the endless, slat-type conveyor 13, a screw conveyor 40 is utilized for engaging and gathering the silage for delivery into the housing 10. In this event the sprocket 12 is not required, but the shaft 15a carries a wheel 41 equipped with paddles or raker teeth 42 for propelling the silage from the conveyor 40 toward the discharge duct 15, as will be clearly apparent.

In the modified form of the device shown in FIGURE 8 the housing 10 is eliminated as is the sprocket 12 and the jacket 44 of the screw conveyor 40 is extended into the casing 17 to provide the discharge duct 15, communicating directly with the venturi throat 26, 28. The blower 19, not shown in this instance, is of course employed for forcing air from the plenum chamber 18 through the venturi throat to discharge the silage from the duct 15 through the outlet 24.

While in the foregoing there have been described and shown the preferred embodiments of the invention, various modifications may become apparent to those skilled in the art to which the invention relates. Accordingly, it is not desired to limit the invention to this disclosure and various modifications and equivalents may be resorted to, such as may lie within the spirit and scope of the invention as claimed.

What is claimed as new is:

1. In a silo unloading machine, the combination of a silage receiving housing provided with an outlet duct, a rotatable propelling member mounted in said housing for delivering silage through said outlet duct, a casing enclosing said outlet duct and an adjacent portion of said housing, said casing having an outlet in alignment with the outlet duct, a venturi throat communicating said outlet duct with the outlet of the casing, and a blower in said casing for delivering air under pressure through said venturi throat to assist said propelling member in discharging silage therethrough.

2. The device as defined in claim 1 together with a drive shaft rotatably journalled in said housing and extending into said casing, said propelling member and said blower being mounted on said drive shaft for rotation thereby.

3. The device as defined in claim 1 wherein said venturi throat includes a set of sleeve-like elements of different diameters disposed in radially spaced and longitudinally overlapped relation with the smallest of said sleeve-like members adjacent said outlet duct and the largest adjacent the outlet of said casing, the spaces between said sleeve-like members forming annular air passages of a progressively greater air flow capacity from the outlet duct toward the outlet of the casing.

4. The device as defined in claim 1 together with an air jet extending from said casing into said housing at a point adjacent and inwardly of said outlet duct.

5. In a silo unloading machine, the combination of a silage receiving housing having a curved end portion provided with a tangential outlet duct, a casing enclosing said curved end portion of said housing and said outlet duct and having an outlet in alignment with the outlet duct, a venturi throat in said casing communicating said outlet duct with the outlet of the casing, a drive shaft rotatably journalled in said housing and extending into the casing, a rotatable propelling member mounted on said drive shaft in said housing for delivering silage through the outlet duct into said venturi throat, and a blower mounted on the drive shaft in the casing for delivering air under pressure through the venturi throat to assist said propelling member in discharging silage therethrough.

6. The device as defined in claim 5 wherein said venturi throat includes a set of sleeve-like elements of different diameters disposed in radially spaced and longitudinally overlapped relation with the smallest of said sleeve-like members adjacent said outlet duct and the largest adjacent the outlet of said casing, the spaces between said sleeve-like members forming annular air passages of a progressively greater air flow capacity from the outlet duct toward the outlet of the casing.

7. The device as defined in claim 5 together with an air jet extending from said casing into said housing at a point adjacent and inwardly of said outlet duct.

8. The device as defined in claim 5 wherein said drive shaft comprises a pair of coaxial and independently rotatable shaft members, one of said shaft members carrying said propelling member and the other carrying said blower, and means for rotating the blower carrying shaft member at a greater speed than the propelling member carrying shaft member.

References Cited in the file of this patent

UNITED STATES PATENTS

| 138,175 | Merrill | Apr. 22, 1873 |
| 2,719,057 | Gamper | Sept. 27, 1955 |

FOREIGN PATENTS

| 1,099,520 | France | Mar. 23, 1955 |